(12) United States Patent
Fukushima et al.

(10) Patent No.: US 10,388,964 B2
(45) Date of Patent: Aug. 20, 2019

(54) GRAPHENE-BASED COATING ON LEAD GRID FOR LEAD-ACID BATTERIES

(71) Applicant: XG SCIENCES, INC., Lansing, MI (US)

(72) Inventors: Hiroyuki Fukushima, Okemos, MI (US); Thomas Ritch, East Lansing, MI (US); Liya Wang, Ann Arbor, MI (US)

(73) Assignee: XG SCIENCES, INC., Lansing, MI (US)

( * ) Notice: Subject to any disclaimer, the term of this patent is extended or adjusted under 35 U.S.C. 154(b) by 0 days.

(21) Appl. No.: 15/446,335

(22) Filed: Mar. 1, 2017

(65) Prior Publication Data

US 2018/0331366 A1  Nov. 15, 2018

Related U.S. Application Data

(60) Provisional application No. 62/303,612, filed on Mar. 4, 2016.

(51) Int. Cl.

| | |
|---|---|
| *H01M 4/66* | (2006.01) |
| *H01M 4/73* | (2006.01) |
| *H01M 10/06* | (2006.01) |
| *B82Y 30/00* | (2011.01) |
| *H01M 4/14* | (2006.01) |
| *H01M 4/68* | (2006.01) |
| *H01M 10/42* | (2006.01) |
| *C09D 7/40* | (2018.01) |
| *C09D 5/24* | (2006.01) |
| *C09D 181/06* | (2006.01) |
| *H01M 4/04* | (2006.01) |
| *H01M 4/16* | (2006.01) |
| *B82Y 40/00* | (2011.01) |

(52) U.S. Cl.
CPC ............. *H01M 4/667* (2013.01); *B82Y 30/00* (2013.01); *C09D 5/24* (2013.01); *C09D 7/70* (2018.01); *C09D 181/06* (2013.01); *H01M 4/0404* (2013.01); *H01M 4/14* (2013.01); *H01M 4/16* (2013.01); *H01M 4/663* (2013.01); *H01M 4/68* (2013.01); *H01M 4/685* (2013.01); *H01M 4/73* (2013.01); *H01M 10/06* (2013.01); *H01M 10/4235* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 4,342,343 A | * | 8/1982 | Clague | H01M 4/20 141/1.1 |
| 2013/0045418 A1 | | 2/2013 | Oguni et al. | |
| 2013/0065034 A1 | * | 3/2013 | Muramatsu | H01B 13/321 428/213 |
| 2015/0044556 A1 | * | 2/2015 | Wang | H01M 4/366 429/213 |
| 2015/0162610 A1 | * | 6/2015 | Zaghib | H01M 4/133 429/221 |

FOREIGN PATENT DOCUMENTS

| | | |
|---|---|---|
| CN | 101969143 A | 2/2011 |
| CN | 201877504 U | 6/2011 |
| CN | 202384440 U | 8/2012 |
| CN | 102709528 A | 10/2012 |
| CN | 103811767 * | 11/2012 |
| CN | 103633331 A | 3/2014 |
| CN | 102244300 B | 4/2014 |
| CN | 103811767 A | 5/2014 |
| CN | 104362301 A | 2/2015 |
| CN | 104505519 A | 4/2015 |
| CN | 104821402 A | 8/2015 |

OTHER PUBLICATIONS

English translation of CN103811767 obtained from Google Dec. 18, 2018.*
Gell, Robert J., "Battery Grid Construction Comparisons, A Technical Report—lead acid battery grid construction & comparisons.", May 2013, 9 pages, GELCOservices Pty. Ltd., 16 Dawson St., Fullarton SA 5063, Australia; Retrieved from the Internet on Dec. 4, 2018; https://www.gelcoservices.com.au/docs/Grid_Construction_Comparisons.pdf.
Yolshina, L.A. et al., "Novel lead-graphene and lead-graphite metallic composite materials for possible applications as positive electrode grid in lead-acid battery", Journal of Power Sources, 2015, Accepted Manuscript, 34 pages, final citation: Journal of Power Sources, Mar. 15, 2015, pp. 87-97, vol. 278, © 2014 Elsevier B.V.; DOI: 10.1016/j.jpowsour.2014.12.036.
International Search Report dated May 16, 2017 for International Application No. PCT/US2017/020323 filed Mar. 2, 2017.

\* cited by examiner

*Primary Examiner* — Sarah A. Slifka
(74) *Attorney, Agent, or Firm* — Avery N. Goldstein; Blue Filament Law PLLC

(57) ABSTRACT

A surface coating for the surface of lead-grids for lead-acid batteries wherein the coating comprises a resin, a material selected from the group consisting of i. graphene and ii. graphene nanoplatelets.

14 Claims, No Drawings

GRAPHENE-BASED COATING ON LEAD GRID FOR LEAD-ACID BATTERIES

This application is a utility application from U.S. Provisional application Ser. No. 62/303,612, filed Mar. 4, 2016 from which priority is claimed.

BACKGROUND OF THE INVENTION

The instant invention deals with graphene-based surface coatings on lead grids for lead-acid batteries to improve the adhesion between the grids and active material pastes, and to reduce the corrosion of the grids. The objective is to improve the performance and life of lead-acid batteries.

Lead-acid batteries (PbA) are one of the most widely used rechargeable batteries in the world, especially for automotive and uninterruptible power supply applications. Traditionally, automotive lead-acid batteries are mostly used for starting, lighting, and ignition (SLI). Such batteries can withstand frequent shallow charging and discharging, but, repeated deep discharges will result in capacity loss and premature failure, as the electrodes disintegrate as a result of mechanical stresses caused by deep cycling.

Additionally, starting batteries kept on continuous float charge tend to have corrosion in the electrodes which will result in premature failure. For some other applications such as UPS, forklifts, etc., lead-acid batteries are designed for deep charge and discharge, but at limited number of cycles. These batteries have low peak currents. Lead-acid batteries have been a relatively mature technology and have been in service for over 100 years.

In recent years, lead-acid batteries have received a lot of attention due to their new potential applications. One of them is in stop-start or micro-hybrid electric vehicles. In such automobiles, the stop-start system automatically shuts down and restarts the internal combustion engine to reduce the amount of time the engine spends idling, thereby reducing fuel consumption and emissions. This is most advantageous for vehicles which spend significant amounts of time waiting at traffic lights or frequently come to a stop in traffic jams. The stop-start function will significantly improve the fuel efficiency and reduce the tailpipe pollution. The traditional lead-acid batteries are attractive for such applications due to their low cost.

Current lead-acid batteries do not meet the performance targets under the cycling conditions of micro-hybrids. There are several major hurdles that need to be overcome. For example, the negative electrode tends to degrade due to the progressive accumulation of $PbSO_4$ under partial state-of-the-charge, high current, and shallow depth-of-discharge.

Other major failure modes are the corrosion of lead grids and delamination of the active material paste from the grids. Both will increase the impedance of the battery and even lose the structure support for the electrode plates. This invention is related to resolving the problems associated with the lead grids.

Lead grids are used as the current collectors and support on which an electrode paste is coated to form a positive or negative plate. For automotive batteries, the positive and negative grids are often designed and manufactured in different forms due to the fact that they are subjected to different electrochemical environments and suffer different types of corrosion and at different levels. The grid surface corrosion is one of the main failure mechanisms for lead-acid batteries.

The corrosion reduces the adhesion between the grid and the active material. When the grid is no longer able to provide structure support and current flow, the battery fails. Therefore, improving the adhesion between the lead grid and paste mixture and reducing corrosion of the grid is one of the key approaches to enhance the performance and extend the life of a lead-acid battery. This is even more important for the stop-start type of applications where frequent, high current, and deep charge and discharge are all needed at different times.

Several methods have been developed to improve the adhesion between lead grid and the active material. For example, a layer of tin, lead-antimony, lead-silver, or lead tin alloy has been coated on the surface of lead-calcium grid to improve the adhesion and protection. Similar surface layers have also been applied by roll-bonding or fusing to the grid.

Chinese patent CN101969143 discloses a method for preparing a nano high-energy maintenance-free lead-acid battery which includes a step of forming superfine glass fiber layers on the surfaces of grids made of a nano ceramic powder and lead metal powder material.

Chinese patent CN201877504 relates to a lead grid consisting of a conducting material layer and a composite material layer. The composite material layer consists of one of lead or lead alloy coating layer, a foam lead layer and an acid-resistant coating layer. The two sides of the conducting material layer are coated with the lead or lead alloy coating layer on which an acid-resistant coating layer is coated. The conducting material layer in the middle of the plate grid serves as a current transmitting passageway so that the resistance is greatly reduced, and the current distribution is more even.

Chinese patent CN10270952 discloses a method for preparing lead-acid battery positive electrode plate that includes the steps of: preparing a positive electrode grid body, conducting electrochemical surface modification of the lead alloy positive grid body, post-treatment of the modified surface of the positive lead alloy grid, and washing and drying of the resulting rare earth modified lead alloy surface of the positive grid.

Chinese patent CN104821402 uses a surface roughening method to improve the adhesion between lead grids and active pastes. The method is mainly characterized by carrying out a plate grid surface roughening treatment, wherein a roughening treatment is performed on the surface of the continuous plate grid framework structure. According to the invention, the bonding force of the punching plate grid and the lead paste can be improved and the method is especially suitable for production of the high-power storage battery punching plate grid.

Chinese patent CN104362301 discloses a preparation method for a carbon coated titanium-based lead dioxide positive plate which is obtained by coating a carbon material on the surface of a metallic titanium mesh with a vapor deposition method.

There are other methods to improve the grid performance in lead-acid batteries. For example, lead-carbon, including lead-graphene and lead-graphite, composites have been tested as possible positive current collectors for lead-acid batteries. It has been shown that neither graphene nor graphite participate in the electrochemical process but they improve corrosion and electrochemical characteristics of both metallic composite materials. No products of interaction of lead with sulfuric acid were formed on the surface of graphene and graphite. Graphene inclusions in lead prevent formation of ready oxide nanocrystals which deteriorate discharge characteristics of positive electrode of lead-acid batteries. Preparation of lead-graphene or lead-graphite composite, however, was performed in molten alkali halides media, thereby increasing the processing complexity and cost.

BRIEF DESCRIPTION OF THE INVENTION

A surface coating for the surface of lead-grids for lead-acid batteries wherein the coating comprises a resin, a material selected from the group consisting of i. graphene and ii. graphene nanoplatelets.

DETAILED DESCRIPTION OF THE INVENTION

The instant invention deals with a graphene-based coating on lead-grids for lead-acid batteries. In one embodiment, the invention provides graphene-based ink formulations that can be applied to the surface of lead-grids to improve adhesion between the grids and the active materials and to prevent the corrosion of the grids.

Graphene and graphene nanoplatelets have several advantages for this application: First, they are electrically conductive and will not hinder the current flow between the lead grid and the active paste. Second, they have a good barrier property with a thin, high aspect ratio, and 2-dimensional morphology, which helps prevent the lead grid from being in contact with the electrolyte. Reaction of lead with water to form lead oxide and hydrogen gas is the main corrosion mechanism for the lead-grid.

Third, a relatively soft but robust coating with high surface area, graphene or graphene nanoplatelet fillers helps improve the adhesion between the lead grid and the active paste. Delamination at the interface of the lead-grid and the active paste is another major reason for lead-acid battery failure as the grid may not provide enough structural support for the electrode plate once the delamination occurs.

The graphene can be single layer graphene or multi-layer graphene nanoplatelet, or a combination thereof. Graphene nanoplatelet is the preferred choice due to its low cost and easy-handling nature as compared to single layer graphene. The thickness and size of graphene or graphene nanoplatelets can be adjusted to meet the processing, coating quality, and battery performance needs. In addition to graphene or graphene nanoplatelet, other additives may be added in the formulation to provide different properties and functionalities. Such additives include but are not limited to graphite, carbon black, carbon fibers, carbon nanotubes, metallic or ceramic flakes or particles.

The composition also contains at least one acid-resistive resin which serves as a binder. The resin may be selected from polycarbonates, polysulfones, polyphenylene sulfide (PPS), fluoropolymers, phenolic resins, epoxies, urethanes, acrylonitrile butadiene styrene (ABS), polystyrene, polyolefins, and copolymers of the polymers set forth just above, among others. They can be used individually or in combination to form a multi-resin system.

In a preferred formulation, the dry coating should contain between 1 wt % and 50 wt % conductive filler, and between 99 wt % and 50 wt % polymer. There should be sufficient polymer to make the coating non-permeable to acid. Yet, there should be enough conductive filler for needed electrical conductivity as well as barrier properties.

In another embodiment, the instant invention also provides methods to apply the graphene-based coating onto the lead-grid. The resin is dissolved in a proper solvent to form a slurry or ink. Depending on the resin system, the solvent may be tetrahydrofuran (THF), N-Methylpyrrolidone (NMP), dimethyl sulfoxide (DMSO), dimethylformamide (DMF), toluene, xylene, dichlorobenzene, alcohols, ketones, or water. Graphene or graphene nanoplatelets, together with other additives are mixed with the resin and solvent to form a slurry or ink. The coating is then applied onto the lead-grid by a method selected from the group including dip coating, spray coating, roller coating, brush coating, and other conventional coating methods.

In a specific embodiment, polysulfone resin is dissolved in an appropriate solvent such as tetrahydrofuran. A conductive carbon blend containing graphene nanoplatelets is dispersed into the polymer solution by high shear mixing to form an ink. Lead grids are then dip coated in this ink such that they are entirely covered in a uniform, continuous coating with a thickness of less than 30 microns. The lead-grids are then transferred to a drying oven to remove residual solvent.

The primary attributes of this coating include: The coating is totally resistant to attack by sulfuric acid in any conditions encountered by a lead acid battery during normal. The materials are electrochemically non-reactive in a PbA system. The coating does not allow acid to reach or corrode the underlying current collector. The coating is sufficiently electrically conductive that the underlying current collector continues to function normally. The coating is thin but the coverage is complete. The coating has strong adhesion to lead and does not delaminate during electrochemical cycling. This coating can be simply applied to existing PbA current collectors without the need for specialized equipment.

EXAMPLES

| Material | wt % |
| --- | --- |
| Tetrahydrofuran | 90.00% |
| Polysulfone | 5.00% |
| xGnPR7 (*) | 3.75% |
| Super C 65 carbon black | 1.25% |
| Total | |

| | Procedure |
| --- | --- |
| 1 | Dissolve polysulfone pellets in tetrahydrofuran |
| 2 | Stir R7 and carbon black into the polymer solution |
| 3 | Disperse using rotor stator high shear mixer, 900 RPM for 2 minutes |
| 4 | Let sit for several hours to degas |

(*) xGnPR7 sample used herein had a surface area of around 50 $m^2/g$ with the average flake thickness around 17.5 nm. The mean particle size of the xGnPR7 sample was about 7 μm, and the aspect ratio of the sample was about 400. xGnP is a trademark owned by Xg Sciences, Lansing, Michigan. xGnP ™

What is claimed is:

1. A surface coating for the surface of lead-grids for lead-acid batteries wherein the coating comprises at least one resin, and a carbon material selected from the group consisting of i. graphene and ii. graphene nanoplatelets;

wherein the carbon materials are at least one of single-layer graphene, multiple-layered graphene, graphene nanoplatelets, or a combination thereof with a thickness from 0.3 nm to 100 nm and a diameter from 0.1 microns to 100 microns;

wherein the surface coating contains 1-50 wt % of carbon materials based on the weight of the total composition; and wherein the surface coating is configured to be applied to both electrodes of the lead- of the lead-acid battery.

2. The surface coating as claimed in claim 1 wherein, in addition, there is also present a functional filler.

3. A surface coating as claimed in claim 1 wherein the carbon materials have a thickness from 1 nm to 30 nm and a diameter from 1 microns to 10 microns.

4. A surface coating as claimed in claim 1 wherein the lead-grid is made of lead or lead-based alloys containing lead and one or more alloy elements selected from the group consisting of calcium, antimony, tin, silver, and selenium.

5. A surface coating as claimed in claim 1 wherein the lead-grid is made of lead-carbon composite comprised of lead or lead-based alloys with one or more carbonaceous reinforcement materials selected from the group consisting of carbon black, graphite, carbon fibers, carbon nanotubes, graphene, or graphene nanoplatelets.

6. A surface coating as claimed in claim 1 wherein the resin is one or more polymers selected from the group consisting of polycarbonates, polysulfones, polyphenylene sulfide (PPS), fluoropolymers, phenolic resins, epoxies, urethanes, acrylonitrile butadiene styrene (ABS), polystyrene, polyolefins, and copolymers of polymers set forth just above.

7. A surface coating as claimed in claim 1 wherein one or mere functional additives are selected from the group consisting of carbon blacks, graphite, carbon fibers, fullerenes, carbon onions, carbon flowers, carbon nanofibers, carbon nanocaps, vapor grown carbon fibers or carbon nanotubes.

8. A surface coating as claimed in claim 1 wherein one or more functional additives are selected from the group consisting of metallic particles, fibers, nanotubes, and flakes.

9. A surface coating as claimed in claim 1 wherein one or more functional additives are selected from the group consisting of ceramic particles, fibers, nanotubes, and flakes.

10. A method of coating a lead-grid with a composition as claimed in claim 1 wherein a slurry or ink of the composition is applied by a method selected from the group consisting of dip coating, spray coating, roller coating, printing, or brush coating.

11. A method of coating a lead-grid with a composition as claimed in claim 1 wherein said composition is applied to said lead-grid wherein the composition is prepared by dissolving a resin in a solvent and mixing the carbon material and functional additives into the resin solution by a method selected from the group consisting of mechanical stirring, shearing, or milling.

12. The method as claimed in claim 11 wherein the solvent is selected from the group consisting of tetrahydrofuran (THF), N-Methyl-pyrrolidone (NMP), dimethyl sulfoxide (DMSO), alcohols, ketones, and water.

13. A surface coating on lead-grids for lead-acid batteries as claimed in claim 1 wherein the coating has a thickness in the range of 1 to 1000 microns.

14. A surface coating on lead-grids for lead-acid batteries as claimed in claim 13 wherein the coating has a thickness in the range of 1 to 50 microns.

* * * * *